United States Patent
McMurtry (10) Patent No.: US 6,487,037 B1
(45) Date of Patent: Nov. 26, 2002

(54) MEMBRANE LOCKING DEVICE FOR SELECTIVELY IMMOBILIZING DISK DRIVE SPINDLE

(75) Inventor: David Harwood McMurtry, San Juan Bautista, CA (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 09/661,326

(22) Filed: Sep. 13, 2000

(51) Int. Cl.[7] .................. G11B 19/04; G11B 17/02; G11B 17/038
(52) U.S. Cl. .................. 360/97.01; 360/98.01
(58) Field of Search ............... 360/97.01, 97.02, 360/133, 98.01

(56) References Cited

U.S. PATENT DOCUMENTS

| | | | | |
|---|---|---|---|---|
| 3,643,240 A | * | 2/1972 | Raiser | 206/303 |
| 4,222,487 A | * | 9/1980 | Abel | 206/308.3 |
| 4,331,989 A | | 5/1982 | Viskochil | |
| 4,458,282 A | * | 7/1984 | Mui et al. | 206/308.3 |
| 4,532,564 A | * | 7/1985 | Larson et al. | 360/133 |
| 4,604,664 A | * | 8/1986 | Barski | 360/133 |
| 4,672,487 A | | 6/1987 | Brand et al. | |
| 5,195,002 A | | 3/1993 | Sakurai | |
| 5,636,090 A | * | 6/1997 | Boigenzahn et al. | 360/256.4 |
| 6,271,986 B1 | * | 8/2001 | Guerini et al. | 360/97.01 |

FOREIGN PATENT DOCUMENTS

| | | | | |
|---|---|---|---|---|
| EP | 488387 A1 | * | 6/1992 | G11B/23/087 |
| JP | 360106080 A | | 6/1985 | |
| JP | 361042776 A | | 3/1986 | |
| JP | 0199269 | | 9/1986 | |
| JP | 0201776 | | 8/1990 | |
| JP | 402254672 A | | 10/1990 | |
| JP | 0100965 | | 4/1991 | |
| JP | 03256263 A | * | 11/1991 | G11B/19/20 |
| JP | 403266256 A | | 11/1991 | |
| JP | 404067380 A | | 3/1992 | |
| JP | 05036221 A | * | 2/1993 | G11B/21/08 |
| JP | 11232756 A | * | 8/1999 | G11B/19/00 |

OTHER PUBLICATIONS

IBM Research Document "Hard disk rotation limiting apparatus for preventing disk pack rotation during shipping and handling", RD 428169 A, Dec. 10, 1999.*

* cited by examiner

Primary Examiner—William Klimowicz
(74) Attorney, Agent, or Firm—Robert B. Martin; Bracewell & Patterson, L.L.P.

(57) ABSTRACT

A disk drive has a base containing disks that are mounted on a central drive hub. A cover is mounted and sealed to the base. The cover has an aperture that is sealed with a flexible membrane. The membrane is selectively deflected into contact with the hub or one of the disks by a displacement device. The displacement device is completely external to the sealed drive to avoid contaminating the drive. In one version, a disposable plastic snap clamp is secured to the drive to lock the disks from rotation. A pusher finger on the clamp automatically engages and deflects the membrane into frictional engagement with the disk to immobilize it. The locked position is used during periods of non-operation of the drive. When the drive is operational, the clamp is removed to release the disks for rotation.

21 Claims, 5 Drawing Sheets

MEMBRANE LOCKING DEVICE FOR SELECTIVELY IMMOBILIZING DISK DRIVE SPINDLE

BACKGROUND OF THE INVENTION

1. Technical Field

The present invention relates in general to an improved disk drive, and in particular to an improved disk drive having a device for immobilizing the disk spindle. Still more particularly, the present invention relates to a membrane-like locking device for selectively immobilizing the disks and/or spindle in a disk drive device.

2. Description of the Prior Art

Generally, a data access and storage system consists of one or more storage devices that store data on storage media such as magnetic or optical data storage disks. In magnetic disk storage systems, a storage device is called a direct access storage device (DASD) or a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at several thousand revolutions per minute (rpm).

The only other moving part within a typical HDD is the head stack assembly. Within most drives, one read/write head is associated with each side of each platter and flies just above or below the platter's surface. Each read/write head is mounted on a suspension to form a head gimbal assembly (HGA). The HGA is then attached to a semi-rigid arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is also mounted the spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

Head-to-disk stiction in disk drives has proven to be more difficult to control as the head-to-disk spacing has decreased. Disk surfaces as well as head surfaces have become smoother to permit closer fly height. This has resulted in increased problems of heads sticking to disks when the drive is at rest. In addition, shock impact of both the head and suspension cause "dings" or dents in the disks and have become more problematic due to several factors. For example, mobile applications, such as laptops, have increased the ambient shock impact of both the head and suspension cause "dings" or dents in the disks and have become more problematic due to several factors. For example, mobile applications, such as laptops, have increased the ambient shock environment. Moreover, the decrease in disk-to-disk spacing has resulted in closer suspension-to-disk spacing, and higher areal densities have made drives more susceptible to even minor dings. In addition, more drives are being handled by untrained personnel in the high-volume marketplace.

To address these problems, future disk drives will have a ramp to unload the heads from the disk when the drive is at rest. Unfortunately, this solution has created a new potential problem. When the heads are at rest on the disk, the slight stiction they created stabilized any random rotation or vibration of the spindle as the drive was being transported. However, with no heads on the disks, the spindle is now free to rotate. Under these circumstances, the spindle ball bearings can experience slight vibratory motion as the drive is being transported. Since there is no continuous rolling of the balls on the races to replenish the lubrication, the lubrication can be forced out of the interface. Without lubrication, there is direct metal-to-metal contact which can cause fretting corrosion of both the races and the balls. This problem is manifested as localized pitting and release of oxide particles. When the bearing becomes operational, the free particles and localized pits can interact to degrade bearing performance. Such a breakdown is typically manifested by increased acoustic noise and non-repeatable run out also have drawbacks such as complexity, decreased reliability, and increased cost. The addition of moving parts within the drive increases the risk of generating contaminants. Moreover, these solutions provide latching even when it not required, such as when the drive is not being transported and not subject to vibration (e.g., the drive is merely non-operational). Thus, an improved disk drive design is needed to immobilize the unrestrained components when the drive is not in operation.

SUMMARY OF THE INVENTION

A disk drive has a base containing disks that are mounted on a central drive hub. A cover is mounted and sealed to the base. The cover has an aperture that is sealed with a flexible membrane. The membrane is selectively deflected into contact with the hub or one of the disks by a displacement device. The displacement device is completely external to the sealed drive to avoid contaminating the drive. In one version, a disposable plastic snap clamp is secured to the drive to lock the disks from rotation. A pusher finger on the clamp automatically engages and deflects the membrane into frictional engagement with the disk to immobilize it. The locked position is used during periods of non-operation of the drive. When the drive is operational, the clamp is removed to release the disks for rotation.

Accordingly, it is an object of the present invention to provide an improved disk drive.

It is an additional object of the present invention to provide an improved disk drive having a device for immobilizing the disk spindle.

Still another object of the present invention is to provide a membrane-like locking device for selectively immobilizing the disks and/or spindle in a disk drive device.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
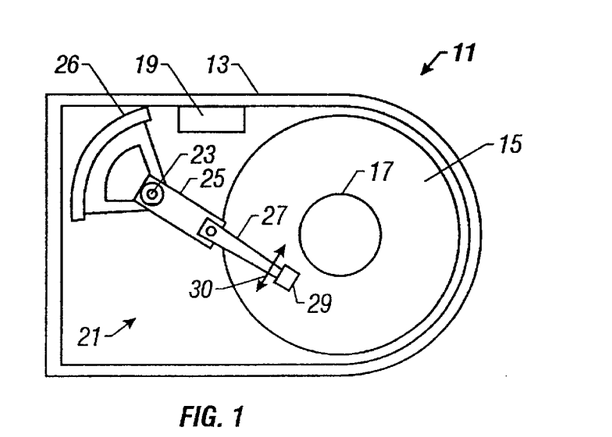
FIG. 1 is a schematic diagram of a disk drive constructed in accordance with the invention and shown with the cover removed.
Figure 2:
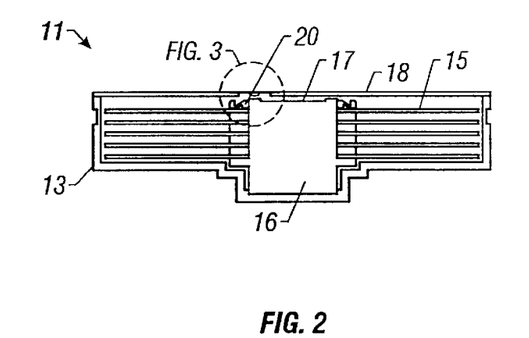
FIG. 2 is a sectional side view of the disk drive of FIG. 1.

Referring to FIG. 1, a schematic drawing of an information storage system comprising a magnetic hard disk file or drive 11 for a computer system is shown. Drive 11 has an outer housing or base 13 containing a plurality of stacked, parallel magnetic disks 15 (one shown) which are closely spaced apart. Disks 15 are rotated by a spindle motor 16 (FIG. 2) located therebelow about a spindle or central drive hub 17. Disks 15 are secured to hub 17 with a disk clamp 20. FIG. 2 shows a side profile of drive 11 with a cover 18 mounted and sealed to base 13 for encapsulating the components of drive 11 therein. An actuator 21 comprises a plurality of stacked, parallel actuator arms 25 (one shown) in the form of a comb that is pivotally mounted to base 13 about a pivot assembly 23. A controller 19 is also mounted to base 13 for selectively moving the comb of arms 25 relative to disks 15.

In the embodiment shown, each arm 25 has extending from it a pair of parallel, cantilevered load beams or suspensions 27, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor voice coil 26 housed within a conventional voice coil motor magnet assembly (not shown) is also mounted to the comb of arms 25 opposite head gimbal assemblies 29. Movement of actuator 21 (indicated by arrow 30) moves head gimbal assemblies 29 radially across tracks on the disks 15 until the heads on assemblies 29 settle on the target tracks.

Figure 3:
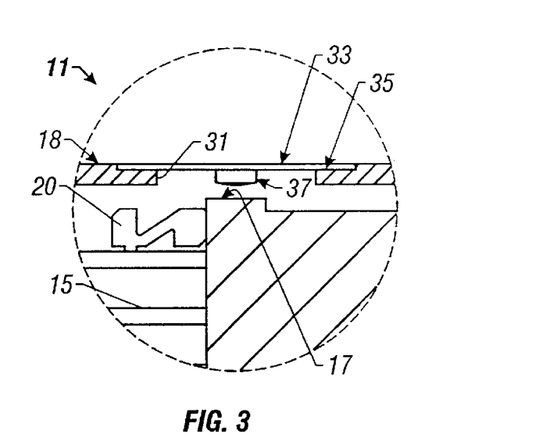
FIG. 3 is an enlarged sectional side view of a portion of the disk drive of FIG. 2.

Referring now to FIG. 3, cover 18 has a small aperture 31 over the motor hub 17 that is sealed with a flexible element 33. In the embodiment shown, element 33 comprises a membrane that is fastened to cover 18 with a pressure sensitive adhesive 35. The diameter of the highly elastic membrane 33 is minimized in order to minimize the opening in cover 18 and degradation of acoustics and stiffness. Alternatively, cover 18 may be formed without an aperture 31 such that element 33 is integrally formed in cover 18 as a thin wall, or the entire cover 18 may operate as element 33. Element 33 is preferably equipped with an optional contact pad 37 that may be bonded or otherwise secured thereto. Ideally, pad 37 has a radiused inner contact surface, and the distance between the underside of cover 18 or pad 37 and the top of hub 17 or disk clamp 20 is approximately 0.75 mm.

Figure 4:
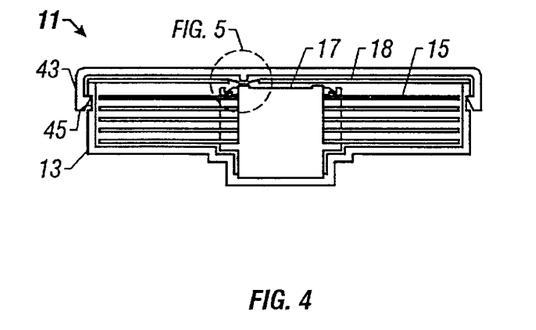
FIG. 4 is a sectional side view of the disk drive of FIG. 2 shown immobilized by a first type of engagement mechanism.
Figure 5:
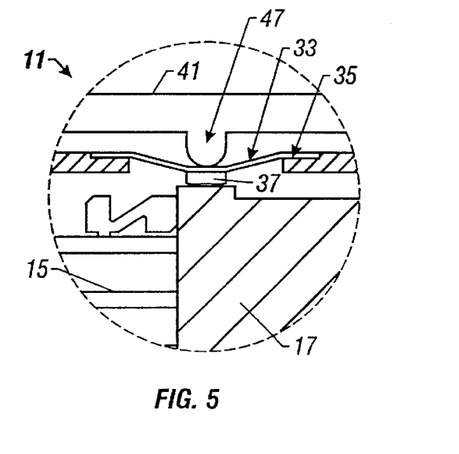
FIG. 5 is an enlarged sectional side view of a portion of the disk drive of FIG. 4.

As shown in FIGS. 4 and 5, element 33 and, thus, pad 37 are designed to be deflected axially inward such that pad 37 contacts a portion of hub 17. The displacement or deflection of element 33 may be accomplished in many ways. In this first embodiment shown, a disposable plastic snap clamp 41 is secured to drive 11 via fingers 43 that snap into recesses 45 in the sidewalls of base 13. When clamp 41 is installed in its locked position (FIGS. 4 and 5), a protrusion or pusher finger 47 automatically engages and deflects element 33 such that pad 37 frictionally engages hub 17 to prevent rotation thereof in order to immobilize disks 15. The amount of axial force used to deflect element 33 must be limited to avoid damage to the ball bearings in hub 17. Thus, clamp 41 is sufficiently compliant so as to not exert too high a force.

In the alternative versions previously described, the cover 18 itself is deflected by finger 47. The locked position is intended to be used during periods of non-operation of drive 11. Clamp 41 need only be activated during times of actual transportation when the spindle or hub 17 is subjected to vibratory excitation. When drive 11 is operational, hub 17 and disks 15 may be selectively and readily released for rotation by detaching clamp 41 from drive 11 (i.e., the unlocked position). Element 33 may be provided with a small metal or plastic plate on its exterior surface to reduce wear of element 33 due to contact with pusher finger 47.

Figure 6:
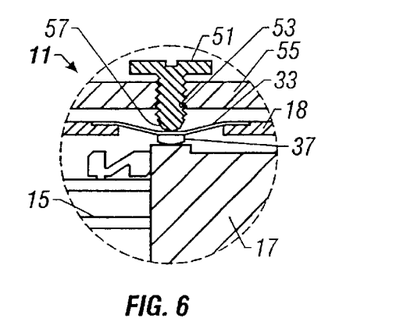
FIG. 6 is an enlarged sectional side view of a portion of the disk drive of FIG. 2 shown immobilized by a second type of engagement mechanism.
Figure 7:
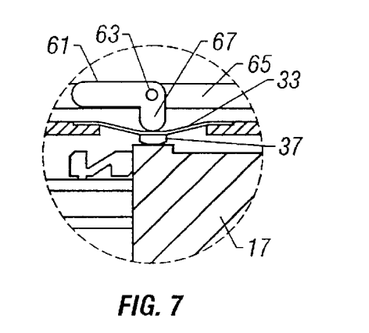
FIG. 7 is an enlarged sectional side view of a portion of the disk drive of FIG. 2 shown immobilized by a third type of engagement mechanism.
Figure 8:
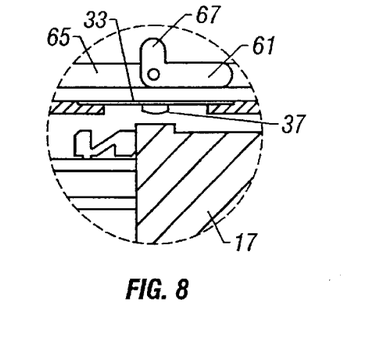
FIG. 8 is an enlarged sectional side view of a portion of the disk drive of FIG. 7 with the third type of engagement mechanism in a disengaged position.
Figure 9:
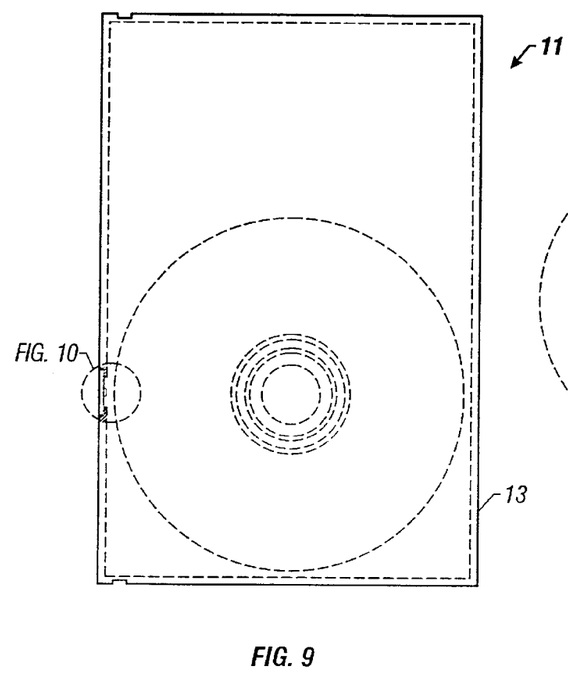
FIG. 9 is a simplified top view of a second embodiment of a disk drive constructed in accordance with the invention.
Figure 10:
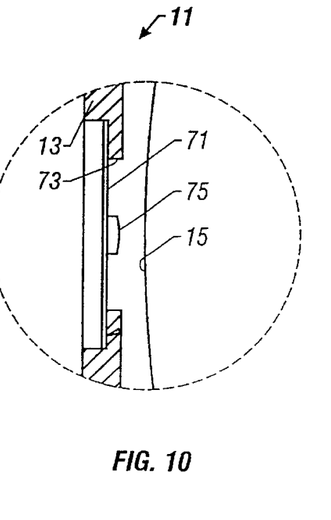
FIG. 10 is an enlarged sectional top view of the disk drive of FIG. 9.
Figure 11:
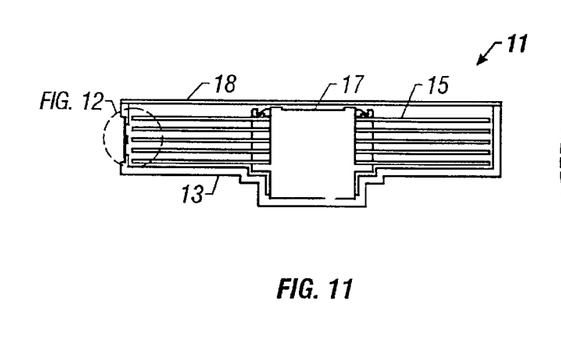
FIG. 11 is a sectional side view of the disk drive of FIG. 9.
Figure 12:
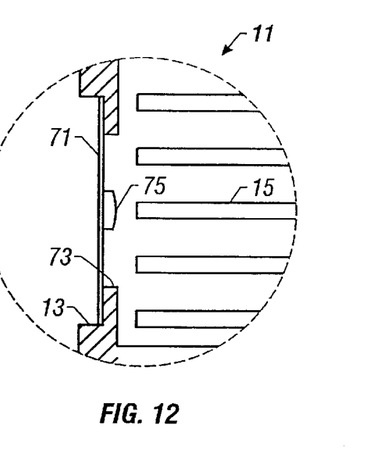
FIG. 12 is an enlarged sectional side view of the disk drive of FIG. 11.

Other illustrative means for deflecting element 33 are suggested in FIGS. 6–8. For example, in FIG. 6, a screw 51 is located in a threaded hole 53 in a structure 55 that is external to drive 11. Structure 55 is secured from movement relative to drive 11 and, in particular, cover 18. When screw 51 is rotated toward drive 11, the tip 57 of screw 51 contacts element 33 and forces pad 37 into contact with hub 17, as described previously, in a locked position. Screw 51 is moved to the unlocked position by rotating it in the opposite direction. In FIGS. 7 and 8, a lever 61 has a pivot 63 and is mounted to an external structure 65 that is similar to structure 55. Lever 61 has a pusher finger 67 to deflect membrane 33 in the locked position (FIG. 7), but may be selectively moved to the unlocked position (FIG. 8) by pivoting lever 61 approximately 180 degrees. Still other means such as a slide-in tab, a wedge, or other means may also be used to accomplish the same purpose. As stated previously for clamp 41, the axial force provided by these devices is limited to avoid damage to the bearings.

Figures 13, 14:
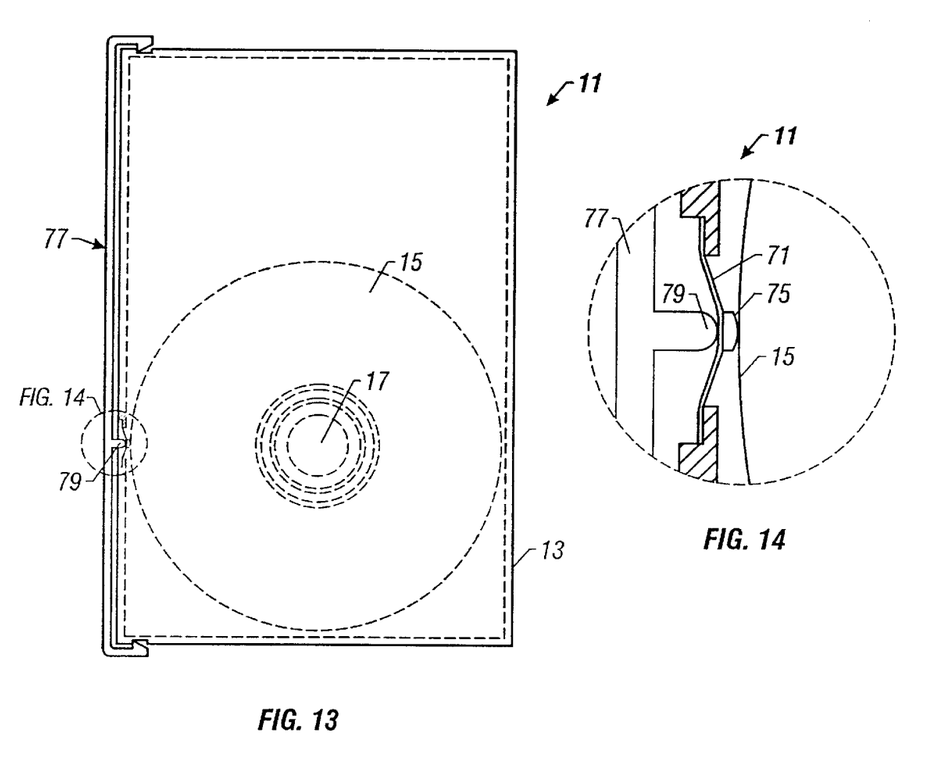
FIG. 13 is a simplified top view of the disk drive of FIG. 9 shown immobilized by one type of engagement mechanism.
FIG. 14 is an enlarged sectional top view of the disk drive of FIG. 13.

These first few examples of the present invention also may be readily implemented for contact with one or more of the disks 15 in drive 11. As shown in FIGS. 9–12, an aperture 73 in one of the sidewalls of base 13 is covered with a flexible element or membrane 71 in the same manner as described above for the previous embodiment. Membrane is preferably bonded and sealed to base 13 and has a contact pad 75 on its inner surface. A snap clamp 77 having a pusher finger 79 (FIGS. 13 and 14) is then selectively mounted to base 13 to lock and unlock disks 15 by displacing the flexible membrane 73. The various other deflection means previously described may also be implemented in this version. The amount of radial force provided by these embodiments is limited so as to avoid pushing the contacted disk 15 out of concentricity and/or damaging the bearings.

Figure 15:
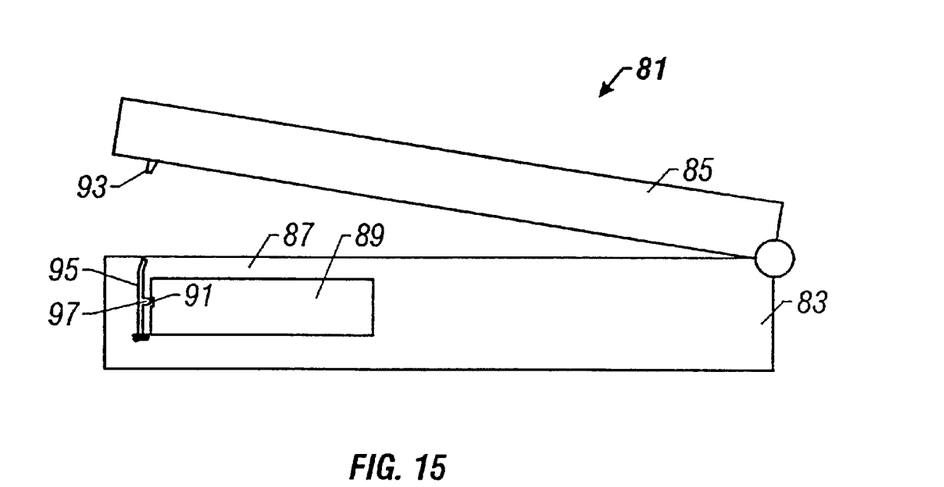
FIG. 15 is a schematic side view of a third embodiment of a disk drive constructed in accordance with the invention and shown in a laptop computer with a cover in an open position.
Figure 16:
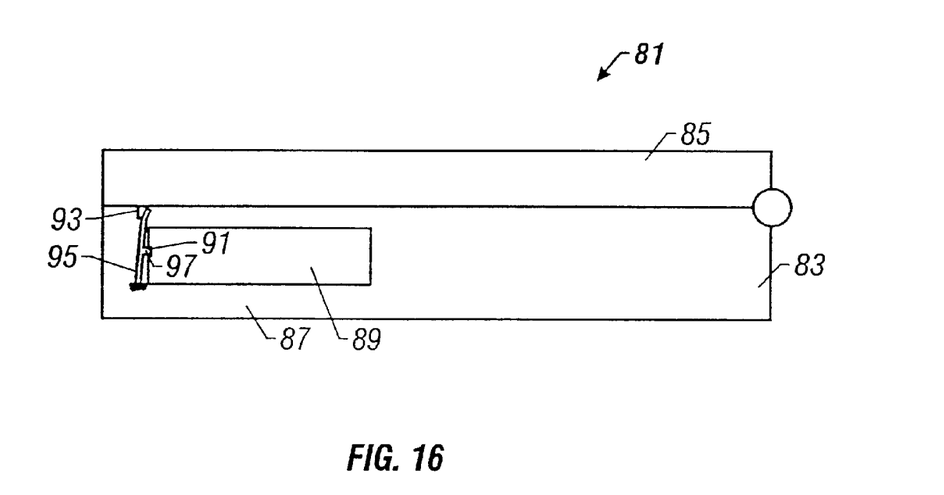
FIG. 16 is a schematic side view of the disk drive of FIG. 15 shown with the cover of the laptop computer in a closed position.

Referring now to FIGS. 15 and 16, the present invention may also be readily incorporated into a laptop computer 81. The term "laptop computer" is used generically throughout this document to include notebook computers and other types of portable computers. Laptop computer 81 has a base 83, a cover 85 pivotally mounted to base 83 for movement between an open position (FIG. 15) and a closed position (FIG. 16). A sealed disk drive 87 having substantially the same components as drive 11 of FIG. 1 is located within base 83. Drive 87 has a housing 89 with a flexible membrane or element 91 that may be integrally formed therein, a spindle and disks. A deflection means in the form of an activation tab 93 is mounted to cover 85. When cover 85 is in the closed position, tab 93 extends through an opening in base 83 to engage a deflector or pivotable lever 95 having a finger 97 for contacting the element 91. This is the previously defined "locked position" that automatically displaces element 91 into engagement with one of the spindle and the disk to prevent the disk from rotating in drive 87. When cover 85 is in the open position, element 91 is free of contact with said one of the spindle and the disk to allow the disk to freely rotate.

The invention has several advantages including the ability to prevent the spindle and disks from unwanted rotation while the drive is not in operation. The lock may be activated during transportation when the spindle is subjected to vibratory excitation. The inner surface of the elastic membrane contacts the top or side of the spindle or disk, respectively, to create the necessary friction to immobilize the drive. The membrane is able to repeatedly contact the spindle or disks without damaging them, and, unlike prior art designs, is sealed from contaminating the drive unit. The invention prevents outgassing and has no change in the following parameters: elasticity, permanent set, and leakage, even after multiple activations due to either adhesive leakage or membrane abrasion by the pusher finger. To reduce the risk of membrane particle generation, the friction between the underside of the membrane and the hub are sufficient to prevent relative motion therebetween during all conditions of vibratory excitation.

While the invention has been shown or described in only some of its forms, it should be apparent to those skilled in the art that it is not so limited, but is susceptible to various changes without departing from the scope of the invention. For example, the invention may be readily implemented in other types of drives as well, such as optically-based drives such as those commonly known in the art.

What is claimed is:

1. A disk drive, comprising:

an enclosure having a flexible element;

a motor mounted to the enclosure;

a spindle mounted to the motor and having an of rotation;

a disk mounted to the spindle for rotation therewith;

an actuator movably mounted to the enclosure for reading data from and writing data to the disk, deflection means for selectively immobilizing the disk the deflection means having a locked position wherein the flexible element is moved to engage one of the spindle and the disk, and an unlocked position wherein the flexible element is released from contact with said one of the spindle and the disk; and wherein the flexible element is formed with the enclosure such that the enclosure itself is deflected when the deflection means is in the locked position.

2. The disk drive of claim 1 wherein the enclosure is sealed and the deflection means is located outside of the enclosure.

3. The disk drive of claim 1 wherein the enclosure has an aperture and the flexible element is a membrane covering the aperture.

4. The disk drive of claim 1, further comprising a contact pad mounted to the flexible element for engaging said one of the spindle and the disk.

5. The disk drive of claim 1 wherein the deflection means is a screw.

6. The disk drive of claim 1 wherein the deflection means is a lever.

7. A disk drive, comprising:

an enclosure having a flexible element;

a motor mounted to the enclosure;

a spindle mounted to the motor and having an axis of rotation;

a disk mounted to the spindle for rotation therewith;

an actuator movably mounted to the enclosure for reading data from and writing data to the disk;

deflection means for selectively immobilizing the disk, the deflection means having a locked position wherein the flexible element is moved to engage one of the spindle and the disk, and an unlocked position wherein the flexible element is released from contact with said one of the spindle and the disk; wherein the deflection means is a clamp.

8. A disk drive, comprising;

a base;

a cover mounted to the base to seal the base, the cover having an aperture;

an elastic membrane secured to the cover and sealed over the aperture;

a motor mounted to the base;

a spindle mounted to the motor and having an axis of rotation, a disk mounted to the spindle for rotation therewith;

an actuator movably mounted to the base for reading data from and writing data to the disk; and deflection means for selectively immobilizing the disk from an exterior of the cover, the deflection means having a locked position wherein the elastic membrane is moved to engage one of the spindle and the disk, and an unlocked position wherein the elastic membrane is released from contact with said one of the spindle and the disk.

9. The disk drive of claim 8, further comprising a contact pad mounted to the membrane for engaging said one of the spindle and the disk.

10. The disk drive of claim 8 wherein the deflection means is a detachable clamp that attaches to the disk drive in the locked position such that a protrusion on the clamp pushes the membrane into contact with said one of the spindle and the disk, and wherein the clamp detaches from the disk drive in the unlocked position.

11. The disk drive of claim 8 wherein the deflection means is a screw that is rotatable between the locked and unlocked positions.

12. The disk drive of claim 8 wherein the deflection means is a lever that is pivotally movable between the locked and unlocked positions.

13. The disk drive of claim 8 wherein the elastic membrane engages the spindle in an axial direction.

14. The disk drive of claim 8 wherein the elastic membrane engages a perimeter of the disk in a radial direction.

15. A laptop computer, comprising:
 a base;
 a cover pivotally mounted to the base for movement between an open position and a closed position;
 a sealed disk drive located within the base and having a housing with a flexible element, a spindle with an axis of rotation, and a disk mounted to the spindle for rotation therewith; and
 deflection means mounted to the cover wherein, when the cover is in the closed position, the deflection means automatically displaces the flexible element into engagement with one of the spindle and the disk to prevent the disk from rotating in the disk drive, and when the cover is in the open position, the flexible element is free of contact with said one of the spindle and the disk to allow the disk to freely rotate.

16. The laptop computer of claim 15 wherein the flexible element is integrally formed with the housing.

17. The laptop computer of claim 15 wherein the housing has an aperture and the flexible element is a membrane covering the aperture.

18. The laptop computer of claim 15 wherein the deflection means comprises:
 an actuator mounted to the cover;
 a deflector mounted to the base; and wherein
 when the cover is in the closed position, the actuator causes the deflector to automatically displace the flexible element into engagement with said one of the spindle and the disk, and when the cover is in the open position, the flexible element is free of contact with said one of the spindle and the disk.

19. The laptop computer of claim 18 wherein the actuator is a tab protruding from the cover, and the deflector is a pivotable lever with a finger for contacting the flexible element.

20. A method of selectively immobilizing a disk in a disk drive, comprising the steps of:
 (a) providing a sealed enclosure with a motor, a spindle mounted to the motor, a disk mounted to the spindle for rotation therewith, an actuator for reading data from and writing data to the disk and a flexible element;
 (b) deflecting the flexible element into engagement with one of the spindle and the disk from an exterior of the enclosure to prevent the disk from rotating; and then to allow the disk to rotate;
 (c) releasing the flexible element from contact with said one of the spindle and the disk; wherein steps (b) and (c) comprise
 attaching a clamp to and removing the clamp from the enclosure such that a protrusion on the clamp displaces and releases the flexible element, respectively.

21. A method of selectively immobilizing a disk in a disk drive, comprising the steps of:
 (a) providing a sealed enclosure with a motor, a spindle mounted to the motor, a disk mounted to the spindle for rotation therewith, an actuator for reading data from and writing data to the disk, and a flexible element;
 (b) deflecting the flexible element into engagement with one of the spindle and the disk from an exterior of the enclosure to prevent the disk from rotating; and then to allow the disk to rotate;
 (c) releasing the flexible element from contact with said one of the spindle and the disk;
wherein steps (b) and (c) comprise
 rotating a screw to displace and release to flexible element, respectively.

* * * * *

UNITED STATES PATENT AND TRADEMARK OFFICE
CERTIFICATE OF CORRECTION

PATENT NO.      : 6,487,037 B1                                       Page 1 of 1
DATED           : November 26, 2002
INVENTOR(S)     : David Harwood McMurtry It is certified that error appears in the above-identified patent and that said Letters Patent is hereby corrected as shown below:

<u>Column 6,</u>
Line 10, please insert the word -- axis -- between the word "an" and "rotation;"

Signed and Sealed this

Ninth Day of September, 2003

JAMES E. ROGAN
*Director of the United States Patent and Trademark Office*